(12) United States Patent
Onozawa

(10) Patent No.: US 6,567,181 B1
(45) Date of Patent: May 20, 2003

(54) PRINTING PROCESSING METHOD AND APPARATUS

(75) Inventor: Hiroshi Onozawa, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/390,473

(22) Filed: Sep. 3, 1999

(30) Foreign Application Priority Data

Sep. 7, 1998 (JP) .......................................... 10-252652
Aug. 17, 1999 (JP) .......................................... 11-230756

(51) Int. Cl.[7] .............................................. G06K 15/00
(52) U.S. Cl. ..................................... 358/1.15; 358/1.13
(58) Field of Search ............................... 358/1.15, 1.1, 358/1.6, 1.5, 1.12, 1.13, 404, 407; 707/1, 7, 8, 10, 14, 15, 17, 19, 20, 267

(56) References Cited

U.S. PATENT DOCUMENTS 6,310,695 B1 * 10/2001 Gauthier et al. .............. 358/1.5

FOREIGN PATENT DOCUMENTS

JP A-5-313839 11/1993

* cited by examiner

Primary Examiner—Arthur G. Evans
(74) Attorney, Agent, or Firm—Oliff & Berridge, PLC

(57) ABSTRACT

A printing processing method and an apparatus therefor, wherein clients 1 set printing starting conditions for objects to be printed and issue a printing request, a job control section 43 starting subjecting the object to be printed to a printing process when a printing condition control section 42 of a print server 4 has detected that the printing starting conditions have been satisfied.

10 Claims, 8 Drawing Sheets

PRINTING PROCESSING METHOD AND APPARATUS

BACKGROUND OF THE INVENTION

1. Field of the Invention

This invention relates to a printing processing method and an apparatus therefor, and more particularly to a printing processing method capable of starting printing operations on the basis of predetermined conditions, and an apparatus therefor.

2. Description of the Prior Art

In an environment in which a printing processing apparatus is owned and used jointly by a plurality of users through a network, the order in carrying out a process starting with the preparing of printing requests and ending with the executing of relative printing operations, i.e. the order in processing printing jobs is usually determined on the basis of the time of occurrence of printing jobs by the issuance of printing requests. Therefore, when unprocessed printing jobs exist at the time of preparing a new printing request, the processing of the new printing request is necessarily delayed until the unprocessed printing jobs have all been processed.

When printing operations are carried out in the order of occurrence of printing jobs, it is impossible to quickly receive the results of certain printing operations.

Under the circumstances, printing jobs are processed in a conventional printing processing method in the order other than the order of occurrence of printing jobs in some cases by giving the order of priority to printing jobs or designating the printing time.

However, even in a case where a higher order of priority is given to a certain printing job, the processing of this printing job is also delayed until the processing of the unprocessed printing jobs has finished, if unprocessed printing jobs of the same order of priority exist. Therefore, when a quick reception of the results of a printing operation is desired, a printing request has to be issued as early as possible.

However, in order to issue a printing request, it is necessary that, at the time of issuance thereof, a document to be printed be preserved with the contents thereof in a finally prepared condition and in a practical printing mode. Namely, when a document to be printed is incomplete, it is impossible to issue a printing request.

In order to issue a printing request by designating beforehand the time at which an object printing job starts being subjected to a printing process, the following inconveniences occur. When the document is completed and possible to be printed before the designated time, the timebetween the instant at which the document is completed and the designated instant becomes useless. When the document is not completed at the designated time, it is impossible to execute the processing of the printing job, and the time-designated pre-engagement of the execution of the printing job becomes invalid. Consequently, a printing request has to be reissued.

In an environment in which a printing apparatus, such as a printing network is owned and used jointly by a plurality of users, making a report on one project by putting together the documents prepared in chapters or pages individually by these users to prepare one final report and output the same is recently becoming a generally-used method of forwarding a piece of work.

In order to forward a piece of work in this manner, the users submit the documents, which have been prepared by themselves, to a project controller by printing out the same, or by sending electronic document files to him, who then puts in order again the documents prepared by the users or ascertains the contents of the documents by checking them as to whether all the documents have been collected or as to whether all the documents have been approved, and thereafter prints out these documents. Therefore, the amount of labor of the controller is very large.

As described above, even when a printing request is made immediately after the completion of an object document in a conventional printing processing apparatus, a printing job occurring due to this printing request is delayed until an unprocessed printing job, if any, has finished being processed. Moreover, even when the printing job processing time is designated beforehand, the time of completion of an object document does not always agree therewith, so that printing the document quickly was impossible.

When a controller prints out the documents prepared by a plurality of users, the time at which he receives the documents from the users does not always agree with each other, so that the controller has to wait for the submission of all documents and make sure of the condition of the documents. Therefore, the amount of labor of the controller is very large, and the reduction of the controller's burden has been demanded.

SUMMARY OF THE INVENTION

Therefore, an object of the present invention is to provide a printing processing method and an apparatus therefor which are adapted to start a printing process on condition of the completion of a documents to be printed.

To achieve this object, an aspect of the present invention provides a printing processing method adapted to print out documents on the basis of a printing request, characterized in that the method includes the steps of preparing a printing job on the basis of the printing request, registering the printing job thus made, in connection with the printing starting conditions set in accordance with the printing request, and executing the printing job, which has been connected with the printing starting conditions, when the printing starting conditions have been satisfied.

Another aspect of the present invention is characterized in that, when the printing starting conditions corresponding to a printing request are not set, printing jobs made on the basis of the printing request are registered in a cue and executed in order, the printing jobs connected with the practical printing starting conditions being executed in preference to the printing starting conditions registered in the cue.

Another aspect of the present invention is characterized in that the printing starting conditions include the transition of the attribute of the document to be printed.

Another aspect of the present invention is characterized in that the printing starting conditions include the alteration of the content of the document to be printed.

Another aspect of the present invention is characterized in that the printing starting conditions include the transition of the condition of execution of other printing jobs.

Another aspect of the present invention provides a printing processing apparatus adapted to print out documents on the basis of a printing request, comprising a means for preparing printing jobs on the basis of the printing request, a means for registering the printing jobs, which have been made by the job preparing means, in connection with a printing starting conditions set correspondingly to the printing request, a printing starting condition control means for detecting the satisfaction of the printing starting conditions, and a means for executing the printing jobs, which are connected with the printing starting conditions, when the printing starting condition control means has detected the satisfaction of the printing starting conditions.

Another aspect of the present invention is characterized in that the apparatus is further provided with a cue control means for registering on a cue, the printing jobs, which have been made by the printing job preparing means, when printing starting conditions corresponding to the printing request are not set and executing the printing jobs in order, the printing job executing means executing the printing jobs, which have been connected with the printing starting conditions, in preference to the printing jobs registered in the cue.

Another aspect of the present invention is characterized in that the printing starting conditions include the transition of attribute of the document to be printed.

Another aspect of the present invention is characterized in that the printing starting conditions include the alteration of the contents of the document to be printed.

Another aspect of the present invention is characterized in that the printing starting conditions include the transition of the condition of execution of other printing jobs.

DESCRIPTION OF THE PREFERRED EMBODIMENTS

The embodiments of the printing processing method and apparatus according to the present invention will now be described in detail with reference to the attached drawings.

Figure 1:
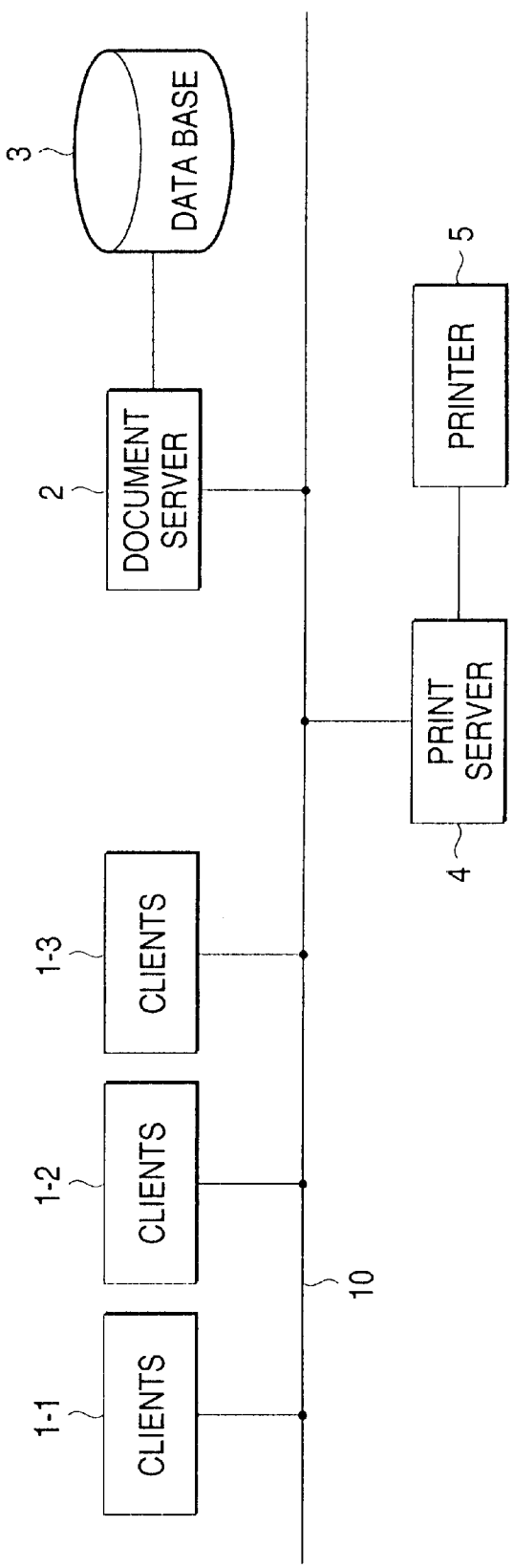
FIG. 1 is a block diagram showing the construction of a printing processing system to which the printing processing method and apparatus according to the present invention are applied.

FIG. 1 is a block diagram showing the construction of a printing processing system to which the printing processing method and apparatus according to the present invention are applied.

Referring to FIG. 1, the printing processing system has clients 1 (1-1, 1-2, 1-3), a document server 2, a data base 3, a print server 4, a printer 5 and a network 10. The clients 1, document server 2 and print server 4 are connected to the network 10; the data base 3 to the document server 2; and the printer 5 to the print server 4.

The clients 1 prepare documents, store the prepared documents in the document server 2, edit a publication by taking out the documents stored in the document server 2, and also request the print server 4 to print the documents existing on the clients 1 and those stored in the document server 2.

The document server 2 is adapted to store the documents, which the clients 1 have prepared, in the data base 3 in connection with the attribute of the documents and control the documents thus stored, and take out or retrieve the documents from the data base 3 in accordance with a request made by the clients 1.

The print server 4 receives printing requests from the clients 1, subjects the documents on the clients 1 and the documents controlled by the document server 2 to a printing process, and outputs the printed documents from the printer 5. In the print server 4, a printing process is carried out in the same manner as in a conventional print server on the basis of the order in which the printing requests occurred, and on the basis of the priority order of the printing jobs, and the printing jobs are subjected to a printing process in order of time at which the printing jobs have satisfied predetermined printing starting conditions.

The print server 4 will now be described with reference to FIG. 2.

Figure 2:
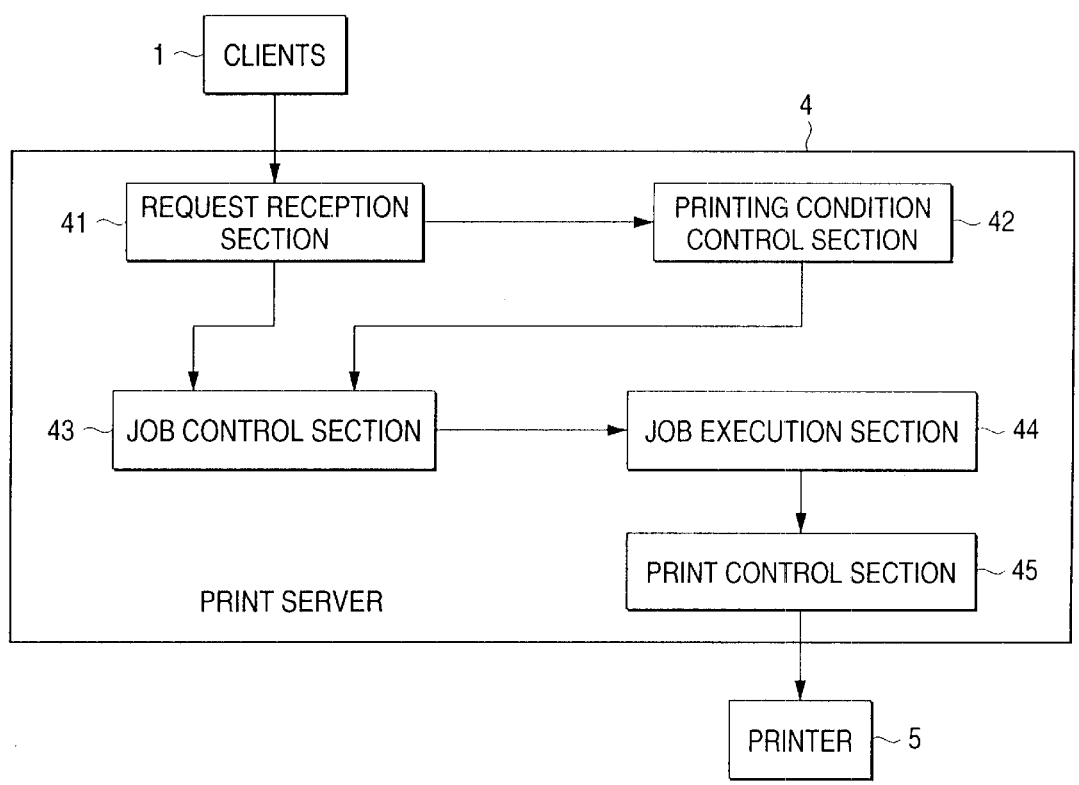
FIG. 2 is a block diagram showing the construction of a print server.

FIG. 2 is a block diagram showing the construction of the print server 4.

Referring to FIG. 2, the print server 4 has a request reception section 41, a printing condition control section 42, a printing job control section 43, a printing job execution section 44 and a printer control section 45.

The request reception section 41 receives printing requests from the clients 1 and prepares printing jobs on the basis of the requests, the printing jobs thus made being registered in the printing job control section 43. When printing starting conditions have been designated in the printing requests corresponding to the printing jobs, the printing starting conditions and printing jobs made are registered in a mutually connected state in the printing condition control section 42. When the printing starting conditions have not been designated, the printing jobs made are registered in the printing job control section 43, and a printing job execution request is issued at once to the printing job control section 43.

The printing condition control section 42 monitors the actions of the clients 1 and document server 2, and, when the satisfaction of the printing starting conditions for the registered printing jobs is detected, it issues a request for executing the printing jobs to the printing job control section 43. The monitoring of the actions of the clients 1 and document server 2 done by the printing condition control section 42 will be described later.

The printing job control section 43 controls the printing jobs made and registered by the request reception section 41, and has the printing job execution section 44 execute the printing jobs on the basis of the execution request issued from the request reception section 41 or the printing condition control section 42.

The job execution section 44 executes the printing jobs notified by the printing job control section 43, and delivers the execution results to the printer control section 45, which carries out an output processing operation by controlling the printer 5 on the basis of the results, which have been delivered by the printing execution section 44, of execution of the printing jobs.

The operation of the print server 4 will now be described with reference to FIGS. 3 and 4.

Figure 3:
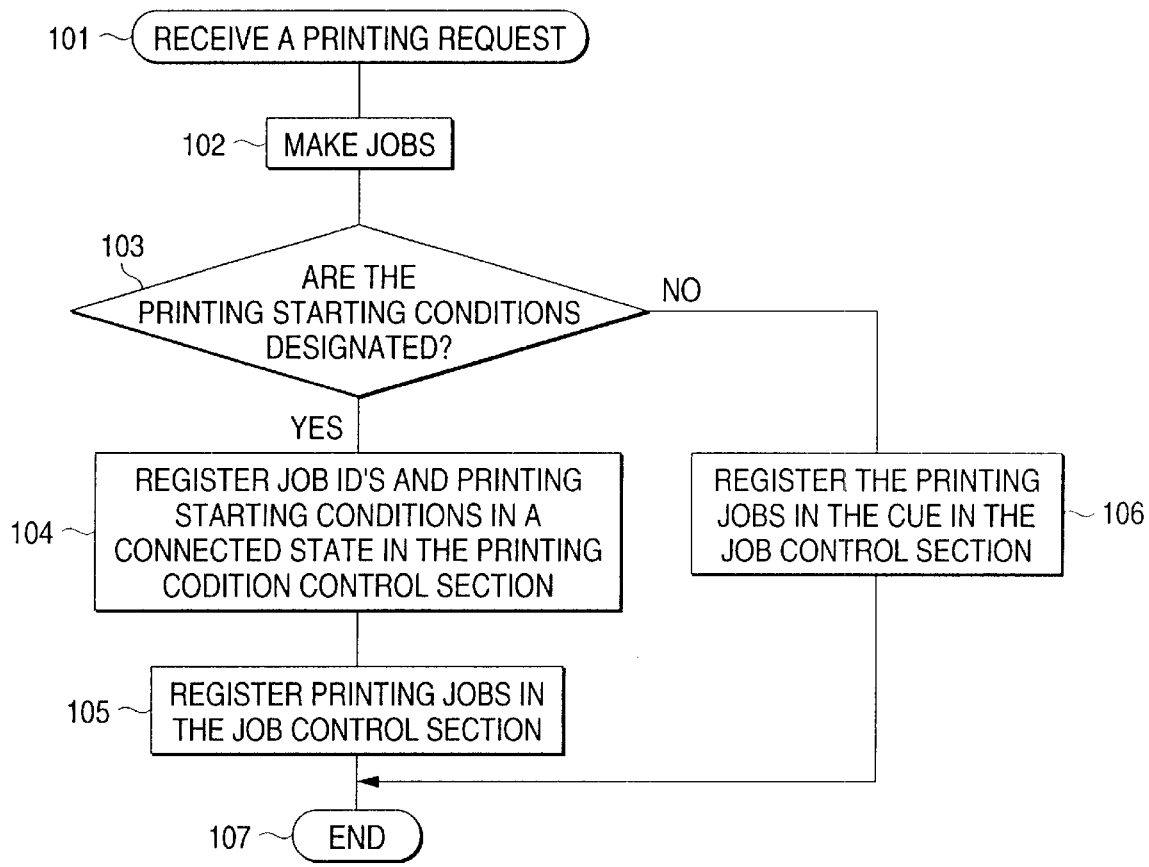
FIG. 3 is a flow chart showing the development through different stages of an operation for dealing with a printing request received.
Figure 4:
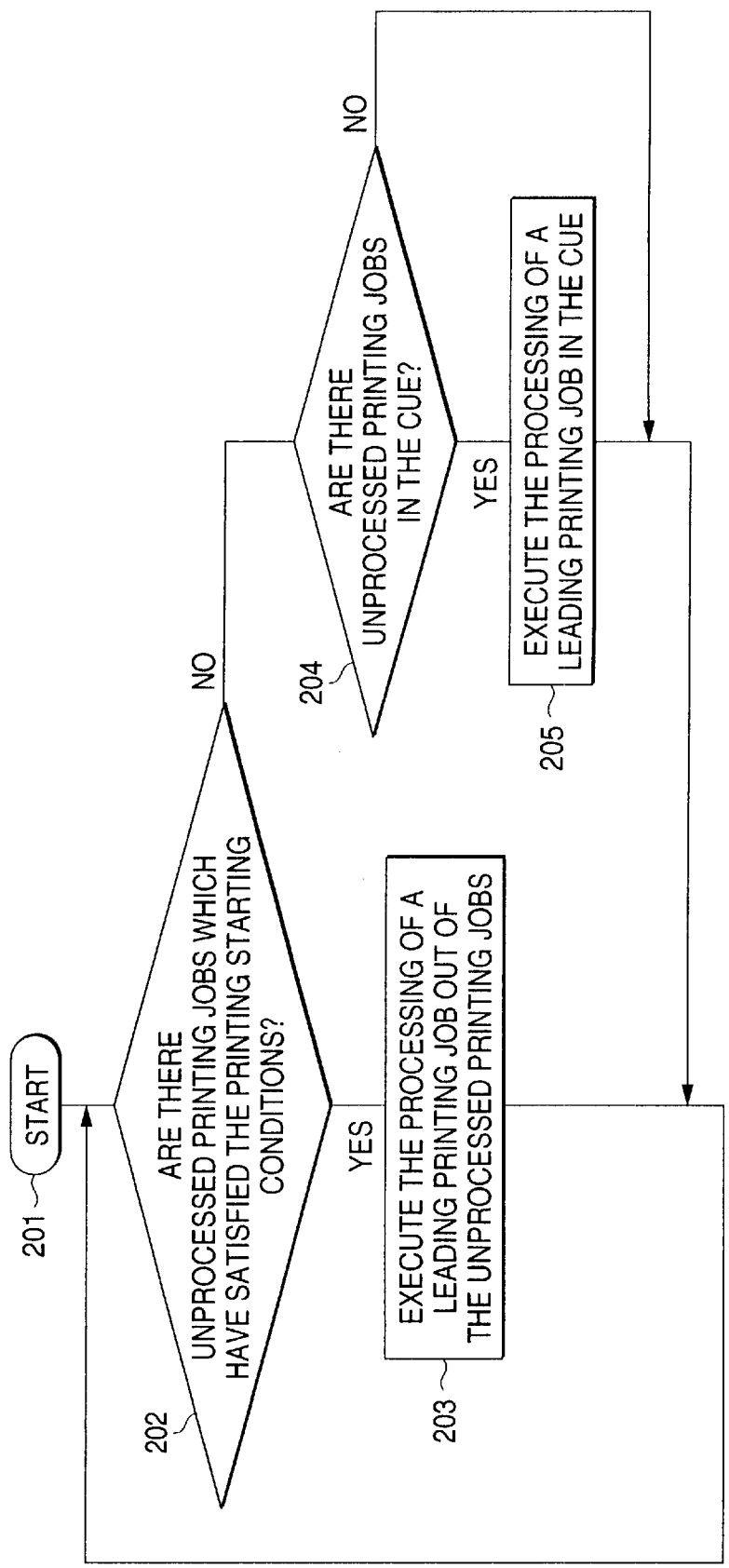
FIG. 4 is a flow chart showing the development through different stages of a printing job processing operation.

FIG. 3 is a flow chart showing the development through different stages of an operation for dealing with a printing request received, and FIG. 4 a flow chart showing the development in different stages of a printing job processing operation.

When the request reception section 41 receives a printing request from the clients 1, the print server 4 starts (Step 101) processing the printing request received, and, first, the request reception section 41 prepares (Step 102) printing jobs.

When printing starting conditions have been designated (the answer for the question made in Step 103 is affirmative) in the printing request for the printing jobs made, the request reception section 41 registers (Step 104) the job IDs for the mentioned printing jobs and the printing starting conditions in a mutually connected state in the printing condition control section 42, and further registers (Step 105) the printing jobs in the printing job control section 43 to complete (Step 107) the processing of the printing request received.

When printing starting conditions are not designated (the answer for the question made in Step 103 is negative) in the printing request for the printing jobs made in Step 102, the printing jobs are registered (Step 106) in a cue in the printing job control section 43 to complete (Step 107) the processing of the printing request received.

When the print server 4 starts (Step 201) a printing processing operation, the printing job control section 43 checks (Step 202) unprocessed jobs satisfying the printing starting conditions as to whether a notice of the job IDs therefor has been given by the printing condition control section 42 or not. When such a notice has been given (the answer for the question made in Step 202 is affirmative) by the printing condition control section, a request for processing a leading printing job (printing job corresponding to a first-informed job ID in a case where notices of a plurality of job IDs have been given) out of the job ID-informed unprocessed printing jobs is made (Step 203) to the printing job execution section 44, and the procedural step is returned to Step 202.

When the notice of job IDs of the unprocessed printing jobs satisfying the printing starting conditions has not been made (the answer for the question made in Step 202 is negative) by the printing condition control section 42, with unprocessed printing jobs existing (the answer for the question made in Step 204 is affirmative) in the cue in the job control section 43, a request for processing the leading job in a cue is made (Step 205) to the printing job execution section 44. When unprocessed printing jobs do not exist (the answer for the question made in Step 204 is negative) in this case, the procedural step is returned to Step 202.

Figure 5:
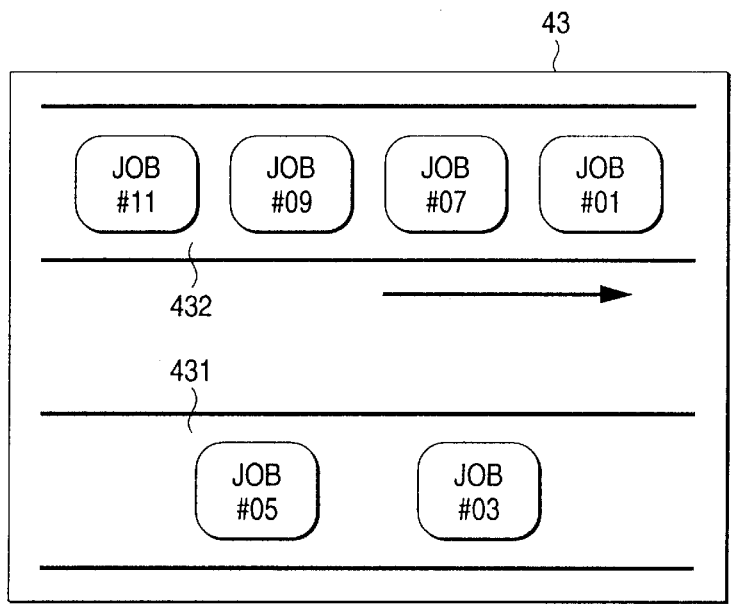
FIG. 5 is a drawing for describing the order in processing printing jobs.

Therefore, when "job #03" and "job #05", are registered in a printing starting condition designated job registration area 431 and "job #1", "job #07", "job #09" and "job #11" in a cue 432 respectively in the job control section 43 as shown in FIG. 5, with the printing starting conditions for "job #03" and "job #05" not satisfied, printing processing operations are carried out for "job #01", "job #07", "job #09", "job #11" in the mentioned order. When the printing starting conditions for "job #03" and then those for "job #05" are satisfied in the midst of the printing processing operation for "job #01", printing processing operations are carried out for "job #01", "job #03", "job #05", "job #07", "job #09 and "job #11" in the mentioned order. Namely, the printing jobs in the cue 432 are normally processed in order but, when there is a printing job satisfying the printing starting conditions, this printing job is subjected to a printing processing operation in preference to those in the cue 432.

The receiving of a printing request and the executing of a printing processing operation described above are done independently, i.e., in parallel with each other. Accordingly, the print server 4 which receives printing requests at all times from the clients 1 carries out printing processing operations while there are printing jobs satisfying the printing starting conditions or printing jobs with printing starting conditions not set thereon.

The monitoring of the printing starting conditions which is done by the printing condition control section 42 will now be described.

Figure 6:
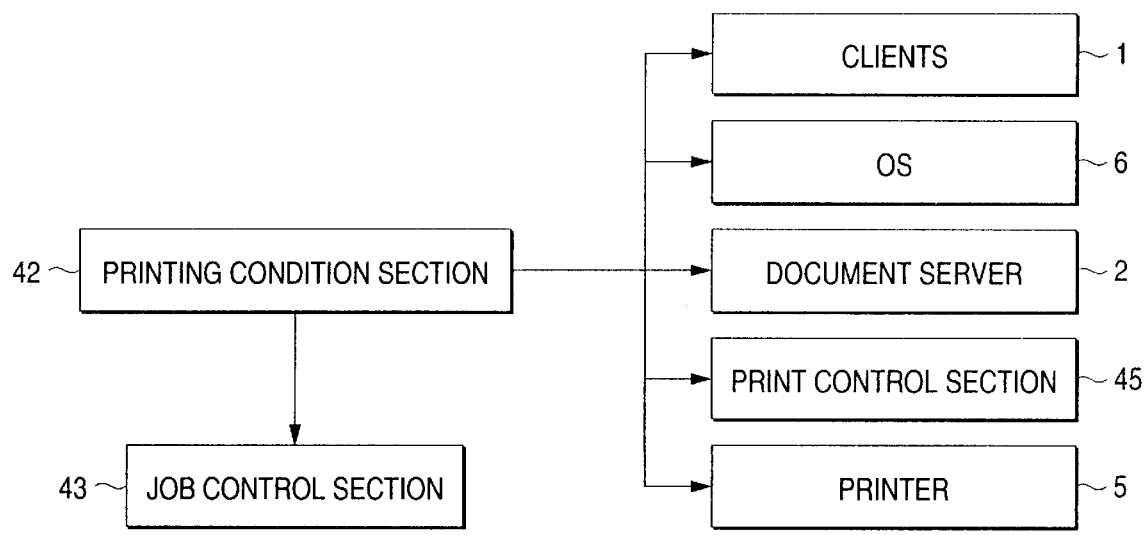
FIG. 6 is a drawing for describing the monitoring of printing starting conditions.
Figure 7:
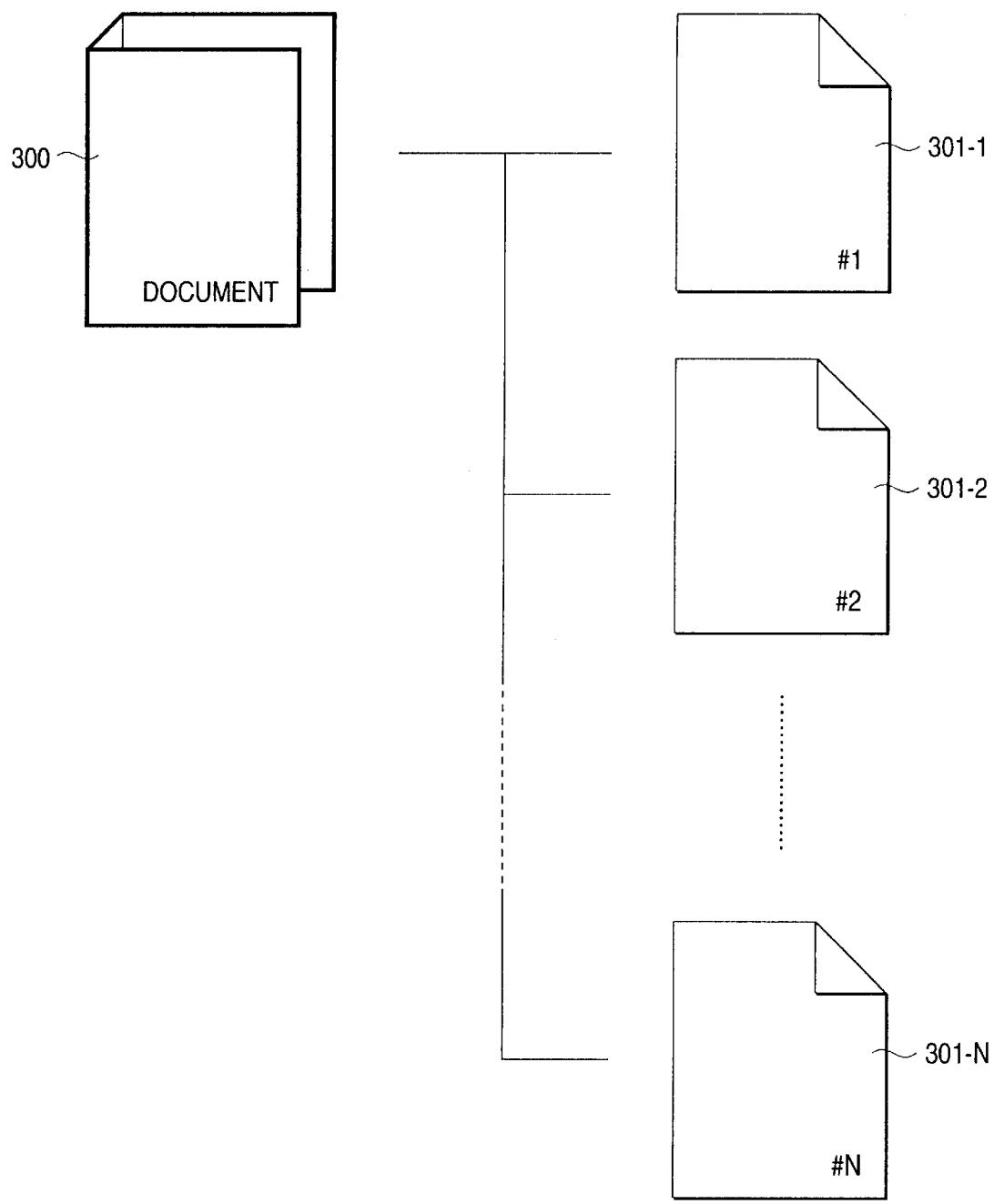
FIG. 7 is a drawing showing an example of the printing starting conditions.

FIG. 6 is a diagram for describing the monitoring of the printing starting conditions.

The printing condition control section 42 has to monitor various events in the system so as to detect the satisfaction of the printing starting conditions set by the clients 1. The printing condition control section 42 monitors for this purpose the clients 1, OS (operating system) 6, document server 2, printer control section 45 and printer 5 as shown in FIG. 6. When a printing job satisfying the printing starting conditions is found out in the results of this monitoring operation, job ID is reported to the job control section 43. For example, when the printing starting conditions are "An object document has been completed and registered in the document server 2.", the printing condition control section 42 can detect the satisfaction of the printing starting conditions by monitoring the document server 2. When this fact has been detected, a corresponding job ID is reported to the job control section 43.

The printing starting conditions will now be described.

The printing starting conditions are roughly divided into the following three.

1. Transition of the attribute of an object to be printed.
2. Alteration of the content of an object to be printed.
3. Transition of the condition of other printing job.

These printing starting conditions will now be described with reference to concrete examples.

First, one document comprising a plurality of subdocuments will be studied as a concrete example of a case where the printing starting conditions include "transition of the attribute of an object to be printed", the first printing starting conditions out of the above three printing starting conditions. This example includes, for example, a case where a document is prepared by a group comprising a plurality of persons in charge of preparing sub-documents and a controller for controlling the document as a whole. In such a case, a document 300 is formed of sub-documents 301-1~301-N, and the respective sub-documents 301-1~301-N are prepared by the persons in charge thereof at the respective clients 1. A sub-document 301 (any of 301-1~301-N) prepared is registered in the document server 2, and the registered sub-document is checked by the controller. In order that the controller gives an O.K. to the results of his check on the sub-document, he changes the attribute of the sub-document 301 from "editing" to "approved". When all the sub-documents 301 have thus been prepared and approved, the attribute of the sub-documents 301 constituting the document 300 is changed to "approved". When the printing condition control section 42 detects the changed attribute of all of the sub-documents 301 at this time, it notifies the job control section 43 of an ID for the document as a sign indicating that the document 300 has satisfied the printing starting conditions. When all the sub-documents 301 have been prepared with the transition of attribute thereof as the printing starting conditions, and checked completely by the controller, a printing processing operation is started.

A concrete example, in which the transition of attribute of an object to be printed constitutes the printing starting conditions, viewed from the side of a user will now be described.

This example will be described on the assumption that a plurality of common members and one manager engage in a project and are preparing a document comprising a plurality of subdocuments.

Different common members are assigned the tasks of preparing different sub-documents, i.e., each member prepares and edits a sub-document. When a sub-document has been completed, the member sends it to the manager.

The manager who has received the sub-document makes sure of the contents thereof, and, when the contents are "OK", he changes the attribute of the sub-document from "editing" to "approved". When the results of a check on the sub-document is "NG", the manager does not change the attribute thereof but requests the member who prepared the sub-document to correct it. The member who is requested to correct the sub-document makes corrections thereon and sends the resultant sub-document to the manager again.

When all sub-documents which thus reach the manager have been "OK", i.e., when the attribute thereof has been approved, they start being printed out.

Figure 8:
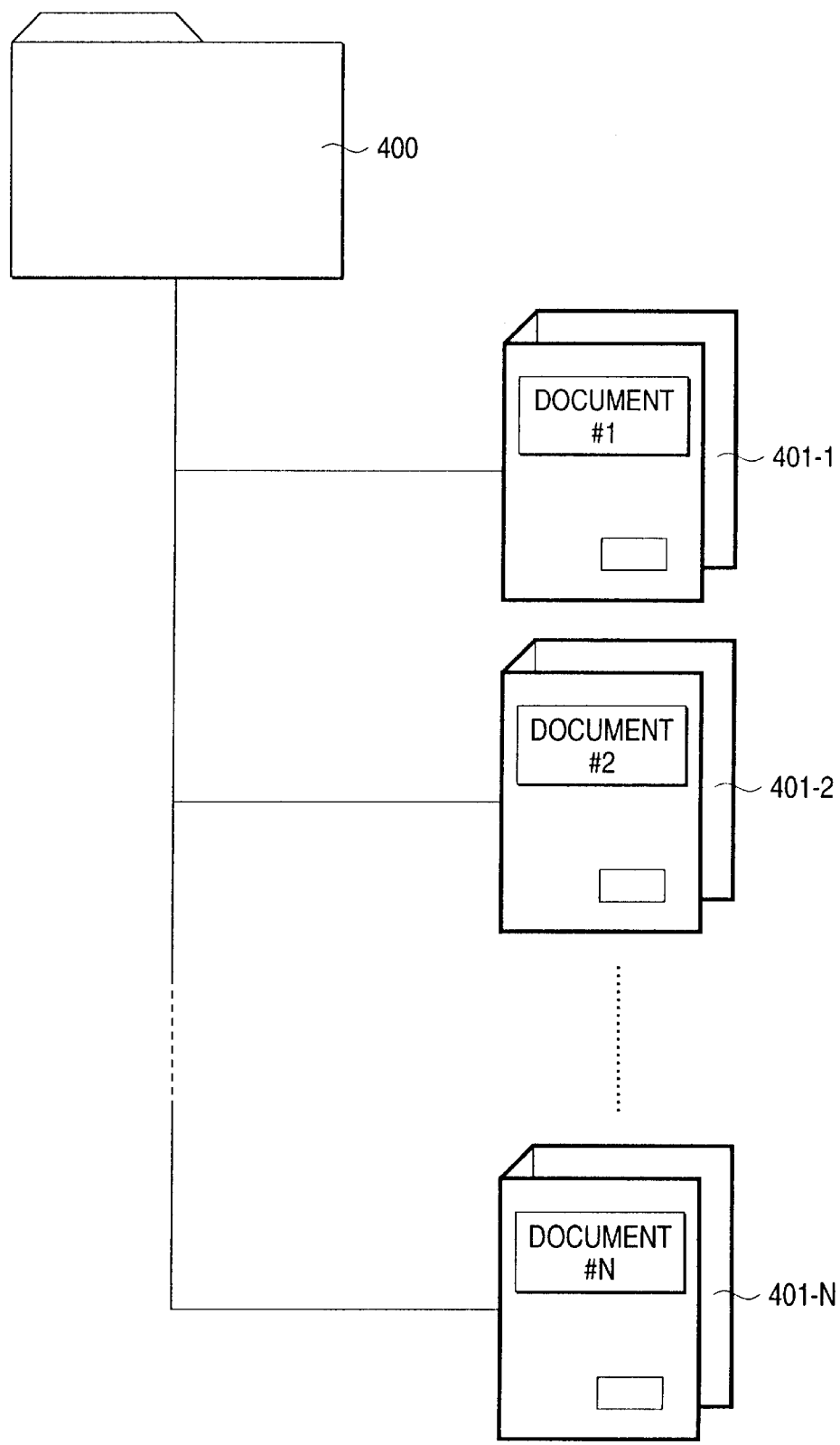
FIG. 8 is a drawing showing another example of the printing starting conditions.

A case where an object to be printed is a folder in which a plurality of documents are stored will now be studied as a concrete example having "alteration of the contents of an object to be printed", the above-mentioned second printing starting conditions. This example corresponds to, for example, a case where the storing of N pieces of documents 401-1~401-N in a folder 400 as shown in FIG. 8 constitutes the printing starting conditions. The documents 401-1~401-N are prepared by different persons in charge, and stored in order of completion in the folder 400. When any of the documents 401-1~401-N is stored, the contents of the folder 400 come to be altered, and, when all of the documents 401-1~401-N are stored, the contents of the folder 400 come to be altered to the contents designated as the printing starting conditions, and the printing condition control section 42 which has detected the fact notifies the job control section 43 of a job ID corresponding to the folder 400.

A concrete example, in which the alteration of the contents of an object to be printed constitutes the printing starting conditions, viewed from the side of a user will now be described.

This example will be described on the assumption that a plurality of documents are prepared in a plurality of departments and delivered on different appointed dates.

In this case, a document collecting department (document requesting department) prepares a folder for storing delivered documents, and requests each department to transfer a completed document to the same folder.

The document requesting department sets the storage of all documents in the folder as the printing starting conditions, and issues a printing request beforehand to the print server.

When the documents have then been prepared by all departments and stored in the designated folder, the print server detects the fact and automatically outputs the documents stored in the folder.

Figure 9A:
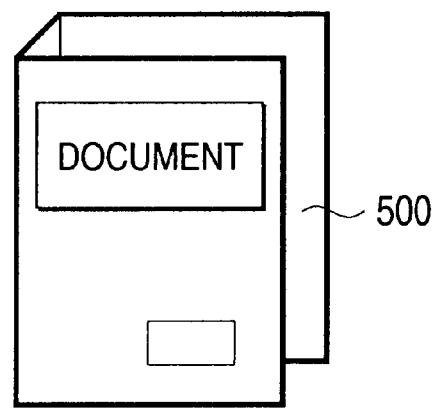
FIGS. 9A and 9B are drawings showing another example of the printing starting conditions.
Figure 9B:
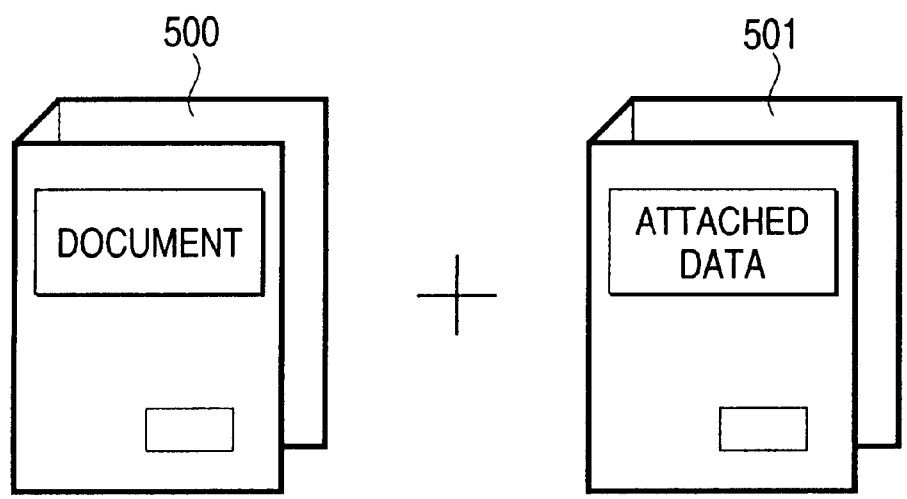

A case where, after a printing request for a certain document has been issued with the printing starting conditions designated, attached data are added will now be studied as a concrete example having "transition of the condition of other printing job", the third printing starting conditions out of the above three printing starting conditions will now be studied. This example corresponds to a case where, after a printing request has been issued with the printing starting conditions designated for a document 500 shown in FIG. 9A, attached data 501 shown in FIG. 9B are added to accomplish a desire of outputting the document 500 and attached data 501 continuously. This desire is realized by setting the completion of execution of a printing job for the document 500 as the printing starting conditions for the attached data 501. When the completion of execution of a printing job for the document 500 is set as the printing starting conditions for the attached data 501, the attached data 501 are not outputted before the document 500; they are outputted immediately after the document 500 has been outputted.

The printing starting conditions described above are examples, and it will be added that the printing starting conditions can be set freely in practice.

As described above, the present invention is constituted by the steps of setting the printing starting conditions on an object to be printed, issuing a printing request therefor, and starting subjecting the object to be printed to a printing process when the printing starting conditions have been satisfied, so that it is possible to issue a printing request within a period of time in which the printing of the object to be printed is impossible, and start subjecting the object to be printed to a printing process immediately after it has become possible to print the object to be printed.

Since the printing starting conditions can be set freely, a plurality of objects to be printed can be printed collectively.

What is claimed is:

1. A printing processing method for printing documents on the basis of a printing request and outputting the printed documents, comprising the steps of:

preparing a printing job on the basis of the printing request;

registering the printing job in connection with a printing starting condition set correspondingly to the printing request; and executing the printing job connected with the printing starting condition, when the printing starting condition is satisfied.

2. A printing processing method according to claim 1, wherein when the printing starting condition corresponding to the printing request is not set, the printing job prepared on the basis of the printing request is registered in a cue and executed in order, and the printing job connected with the printing starting condition is executed in preference to the printing job registered in the cue.

3. A printing processing method according to claim 1, wherein the printing starting condition comprises the transition of an attribute of an object document to be printed.

4. A printing processing method according to claim 1, wherein the printing starting condition comprises the alteration of the contents of an object document to be printed.

5. A printing processing method according to claim 1, wherein the printing starting condition comprises the transition of the state of execution of another printing job.

6. A printing processing apparatus for printing documents on the basis of a printing request and outputting the printed documents, comprising:

means for preparing a printing job on the basis of the printing request, means for registering the printing job in connection with a printing starting condition set correspondingly to the printing request, printing starting condition control means for detecting that the printing starting condition is satisfied, and means for executing the printing job connected with the printing starting condition when the printing starting condition control means has detected that the printing starting condition has been satisfied.

7. A printing processing apparatus according to claim 6, further comprising:

cue control means for registering the printing job on a cue when the printing starting condition corresponding to the printing request is not set, and executing the same printing jobs in order, wherein the job executing means executes the printing job connected with the printing starting condition in preference to other jobs registered in the cue.

8. A printing processing apparatus according to claim 6, wherein the printing starting condition comprises the transition of an attribute of an object document to be printed.

9. A printing processing apparatus according to claim 6, wherein the printing starting condition comprises the alteration of the contents of an object document to be printed.

10. A printing processing apparatus according to claim 6, wherein the printing starting condition comprises the transition of the condition of execution of another printing job.

* * * * *